(12) United States Patent
Matsushima et al.

(10) Patent No.: US 9,578,983 B2
(45) Date of Patent: Feb. 28, 2017

(54) APPARATUS FOR PRODUCING PARBOILED RICE

(75) Inventors: Hideaki Matsushima, Tokyo (JP); Hidenori Mizuno, Tokyo (JP); Keishi Wakabayashi, Tokyo (JP); Akiko Nishimura, Tokyo (JP); Naoya Uemuki, Tokyo (JP)

(73) Assignee: Satake Corporation (JP)

(*) Notice: Subject to any disclaimer, the term of this patent is extended or adjusted under 35 U.S.C. 154(b) by 351 days.

(21) Appl. No.: 14/352,686

(22) PCT Filed: Oct. 26, 2011

(86) PCT No.: PCT/JP2011/006004
§ 371 (c)(1),
(2), (4) Date: Apr. 18, 2014

(87) PCT Pub. No.: WO2013/061372
PCT Pub. Date: May 2, 2013

(65) Prior Publication Data
US 2014/0251161 A1    Sep. 11, 2014

(51) Int. Cl.
*A23L 1/00*    (2006.01)
*A47J 37/12*   (2006.01)
(Continued)

(52) U.S. Cl.
CPC ............ *A47J 27/04* (2013.01); *A23B 7/06* (2013.01); *A23L 7/196* (2016.08);
(Continued)

(58) Field of Classification Search
CPC .......................... A47J 37/1214; A23B 7/06
(Continued)

(56) References Cited

U.S. PATENT DOCUMENTS 4,157,061 A    6/1979  Margus, Jr.
4,338,344 A *  7/1982  Brooks .................... A23L 1/182
                                                                426/461
(Continued)

FOREIGN PATENT DOCUMENTS

CN    2680036 Y    2/2005
CN    101822335 A  9/2010
(Continued)

OTHER PUBLICATIONS

'Parboiling in Thailand and the World' pp. 42-49. [online]; Sontag Consult, 2011. [retrieved on Jul. 11, 2011]. Retrieved from the Internet: <URL: http://www.sontag-consult.
(Continued)

*Primary Examiner* — Reginald L Alexander
(74) *Attorney, Agent, or Firm* — Lerner, David, Littenberg, Krumholz & Mentlik, LLP (57) ABSTRACT

An object of this invention is to provide a parboiled rice manufacturing apparatus capable of efficiently manufacturing good-quality parboiled rice without increasing the overall size of the apparatus.
A parboiled rice manufacturing apparatus according to this invention includes a drum which has a raw material hatch provided at a peripheral surface and is disposed to be rotatable about a horizontal axis, a heating unit which is disposed inside the drum and heats an interior of the drum, an agitation unit which is disposed inside the drum and agitates a raw material charged through the raw material hatch into the drum, a steam supply unit which supplies steam into the drum, a pressure adjustment unit which has a valve allowing communication of the interior of the drum with outside air and allows increase of pressure inside the drum with steam supplied from the steam supply unit by closing the valve at the time of processing of the raw material through the pressurized steam-boiling treatment, a
(Continued)

water addition unit which is disposed inside the drum and adds water to the raw material inside the drum, and a drying unit which dries the raw material by reducing the pressure inside the drum.

6 Claims, 3 Drawing Sheets (51) Int. Cl.
*A47J 27/04* (2006.01)
*A23B 7/06* (2006.01)
*F26B 5/12* (2006.01)

(52) U.S. Cl.
CPC ............ *A47J 37/1214* (2013.01); *F26B 5/12* (2013.01); *A47J 2027/043* (2013.01)

(58) Field of Classification Search
USPC ...... 99/404, 409, 477, 516, 487, 330, 443 C
See application file for complete search history.

(56) References Cited

U.S. PATENT DOCUMENTS

| | | | |
|---|---|---|---|
| 5,802,961 A * | 9/1998 | Hay | A23B 7/0053 165/111 |
| 5,997,930 A | 12/1999 | Kendall et al. | |
| 6,234,066 B1 * | 5/2001 | Zittel | A23B 7/06 99/348 |
| 6,487,962 B1 * | 12/2002 | Horn | A23L 1/0121 99/330 |
| 7,380,978 B2 * | 6/2008 | Damhuis | A23L 3/001 366/175.3 |
| 2008/0220145 A1 | 9/2008 | Fukumori et al. | |
| 2010/0323087 A1 | 12/2010 | Fukumori et al. | |

FOREIGN PATENT DOCUMENTS

| | | |
|---|---|---|
| GB | 494085 A | 10/1938 |
| GB | 563792 A | 8/1944 |
| GB | 669900 A | 4/1952 |
| JP | 30-15793 Y1 | 10/1955 |
| JP | 33-191 Y1 | 1/1958 |
| JP | 63-22877 Y2 | 6/1988 |
| JP | 3352133 B2 | 12/2002 |
| JP | 2008-182968 A | 8/2008 |
| JP | 2008-220221 A | 9/2008 |
| JP | 2009-27950 A | 2/2009 |
| JP | 2011-56 A | 1/2011 |

OTHER PUBLICATIONS

Written Opinion for PCT/JP2011/006004 dated Nov. 29, 2011.
International Preliminary Report for PCT/JP2011/006004 dated Apr. 29, 2014.

* cited by examiner

APPARATUS FOR PRODUCING PARBOILED RICE

TECHNICAL FIELD

The present invention relates to a parboiled rice manufacturing apparatus.

BACKGROUND ART

Conventional parboiled rice is a kind of processed rice that is produced and eaten mainly in the Asian region including India and Pakistan and in some parts of America and Europe.

The parboiled rice has been manufactured by steaming unhulled rice after sufficient soaking to gelatinize starch of rice grains and then performing drying, hulling, and milling. For this reason, endosperm is impregnated with, e.g., the smell of a hull and has a flavor of hull.

Parboiled rice free of hull smell has been developed in recent years to meet diversified tastes of consumers, and manufacturing methods for the parboiled rice have been proposed (see Patent Literatures 1 to 3).

The manufacturing methods described in Patent Literatures 1 and 2 include a process of subjecting brown rice as a raw material to partial milling treatment, subjecting grains of the rice subjected to the partial milling treatment to water addition treatment with, e.g., a mist or moist forced air, subjecting the moisture of the rice grains subjected to the water addition treatment to tempering treatment, subjecting the rice grains with the moisture subjected to the tempering treatment to atmospheric steam-boiling treatment with steam, subjecting the rice grains subjected to the atmospheric steam-boiling treatment to pressurized steam-boiling treatment with pressurized steam, subjecting at least the surface of each rice grain subjected to the pressurized steaming to cooling treatment, subjecting the rice grains subjected to the cooling treatment to finish milling treatment, and subjecting the rice grains subjected to the finish milling treatment to drying treatment.

Since the manufacturing methods include steaming of brown rice, parboiled rice free of hull smell can be obtained.

At the manufacture of parboiled rice, rice grains need to be subjected to water absorption as pretreatment of pressurized steam-boiling treatment in order to gelatinize starch of each rice grain to the center through the pressurized steam-boiling treatment. In contrast, the manufacturing methods subject rice grains to water absorption not through soaking treatment but through water addition treatment and do not need use of a large amount of water and provision of drainage treatment equipment.

In the above-described manufacturing methods, however, if the amount of water added is increased to accelerate the speed of water absorption of rice grains at the time of the water addition treatment, a crack may appear in the surface of each rice grain to degrade the appearance quality of the rice grain.

Additionally, the parboiled rice manufacturing apparatuses described in Patent Literatures 1 and 2 each include a piece of dedicated equipment for each treatment in the above-described manufacturing method and suffer from the problem of increasing the overall size of the apparatuses.

The manufacturing method described in Patent Literature 3 subjects brown rice to preliminary pressurized steam-boiling treatment, prior to the above-described water addition treatment in the manufacture of parboiled rice described in Patent Literatures 1 and 2 described above.

According to the manufacturing method, starch of each rice grain is gelatinized only at a surficial portion by the preliminary pressurized steam-boiling treatment, and the surface of the rice grain is toughened by a gelatinized layer. For this reason, even if the amount of water added is increased to accelerate the speed of water absorption of rice grains, a crack does not appear in the surface of the rice grain. The manufacturing method allows manufacture of parboiled rice, grains of which have good appearance quality.

The parboiled rice manufacturing apparatus described in Patent Literature 3, however, also includes a piece of dedicated equipment for each treatment in the above-described manufacturing method and suffers from the problem of increase in overall size.

There is also proposed an apparatus for manufacturing parboiled rice in batches (see Non Patent Literature 1).

The manufacturing apparatus described in Non Patent Literature 1 subjects unhulled rice or brown rice to pressurized steam-boiling treatment inside a container and dries the brown rice or the like subjected to the pressurized steam-boiling treatment inside the container. A plurality of treatments can be performed inside the same container.

The manufacturing apparatus described in Non Patent Literature 1 described above, however, includes two large tanks for subjecting the brown rice or the like to soaking treatment as pretreatment of the pressurized steam-boiling treatment.

For this reason, the manufacturing apparatus described in Non Patent Literature 1 described above requires provision of large drainage treatment equipment and does not necessarily solve the problem of increase in overall size.

CITATION LIST

Patent Literature

Patent Literature 1
Patent JP2008-220221A
Patent Literature 2
Patent JP2009-27950A
Patent Literature 3
Patent JP2011-56A

Non Patent Literature

Non Patent Literature 1
'Parboiling in Thailand and the World' pages 42-49. [online]; Sontag Consult, 2011. [retrieved on 2011-07-11]. Retrieved from the Internet: <URL: http://www.sontag-consult.com/en/downloads/Parboiling-KasetsartV5.pdf>

SUMMARY OF INVENTION

Technical Problem

Under the circumstances, the present invention has as its object to provide a parboiled rice manufacturing apparatus capable of efficiently manufacturing good-quality parboiled rice without increase in overall size.

Solution to Problem

In order to attain the above-described object, according to the present invention, there is provided a parboiled rice manufacturing apparatus for processing a raw material inside a drum through pressurized steam-boiling treatment and drying the processed raw material inside the drum, including a drum which has a raw material hatch provided at a peripheral surface and is disposed to be rotatable about a horizontal axis, heating means disposed inside the drum for heating an interior of the drum, agitation means disposed inside the drum for agitating a raw material charged through the raw material hatch into the drum, steam supply means for supplying steam into the drum, pressure adjustment means having a valve which allows communication of the interior of the drum with outside air for allowing increase of pressure inside the drum with steam supplied from the steam supply means by closing the valve at the time of processing of the raw material through the pressurized steam-boiling treatment, water addition means disposed inside the drum for adding water to the raw material inside the drum, and drying means for drying the raw material by reducing the pressure inside the drum.

In the parboiled rice manufacturing apparatus according to the present invention, it is preferable that the water addition means includes a water addition pipe which is disposed inside the drum and that water is added, using the water addition pipe, to the raw material after preliminary pressurized steam-boiling treatment for forming a gelatinized layer at the surficial portion of each grain of the raw material in the drum.

In the parboiled rice manufacturing apparatus according to the present invention, it is preferable that the drying means has a vacuum pump which is capable of communicating with the interior of the drum, and tempers the raw material after water addition by the water addition means and then dries the raw material after the pressurized steam-boiling treatment by reducing the pressure inside the drum using the vacuum pump.

The parboiled rice manufacturing apparatus according to the present invention preferably further includes air supply means for supplying air into the drum using the water addition means at the time of drying of the raw material by the drying means.

In the parboiled rice manufacturing apparatus according to the present invention, it is preferable that the steam supply means supplies steam into the drum through an opening which is formed in the middle of a first end face of the drum and that the pressure adjustment means allows the interior of the drum to communicate with outside air through an opening which is formed in the middle of a second end face of the drum.

In the parboiled rice manufacturing apparatus according to the present invention, it is preferable that a screen which uniformly disperses steam supplied from the steam supply means into the drum is disposed on a side closer to the first end face on an inner peripheral surface of the drum.

Advantageous Effects of Invention

In a parboiled rice manufacturing apparatus according to the present invention, water addition means disposed inside a drum subjects a raw material to water absorption by adding a small amount of water sufficient for gelatinization to the raw material inside the drum. This eliminates the need for a tank for soaking treatment and the need to provide drainage treatment equipment for the tank.

The parboiled rice manufacturing apparatus according to the present invention can perform a series of treatments, subjecting a raw material to water absorption, processing the raw material subjected to the water absorption through pressurized steam-boiling treatment, and drying the processed raw material, inside the same drum and is thus free of increase in overall size as in a conventional apparatus.

Assume that the parboiled rice manufacturing apparatus according to the present invention is configured such that an interior of the drum is constantly heated by heating means disposed inside the drum during the series of treatments performed inside the drum. This configuration can make a raw material likely to absorb water, which allows water absorption in a short time by the raw material. The configuration also allows a raw material processed through the pressurized steam-boiling treatment to be dried in a short time.

If the parboiled rice manufacturing apparatus according to the present invention is configured such that a raw material inside the drum is constantly agitated by agitation means disposed inside the drum during the series of treatments performed inside the drum, the parboiled rice manufacturing apparatus can evenly and uniformly subject the whole of the raw material inside the drum to the series of treatments.

Thus, the parboiled rice manufacturing apparatus according to the present invention can efficiently manufacture good-quality parboiled rice.

Assume that the parboiled rice manufacturing apparatus according to the present invention is configured such that the water addition means includes a water addition pipe disposed inside the drum and such that water is added, using the water addition pipe, to a raw material after preliminary pressurized steam-boiling treatment for forming a gelatinized layer at the surficial portion of each grain of the raw material in the drum. Since the surface of a raw material is toughened by a gelatinized layer in this case, if the amount of water added is increased to accelerate the speed of water absorption of the raw material, a crack does not appear in the surface of the raw material.

Thus, the parboiled rice manufacturing apparatus according to the present invention can efficiently manufacture parboiled rice with good appearance quality.

In addition, in the parboiled rice manufacturing apparatus according to the present invention, a raw material after the preliminary pressurized steam-boiling treatment inside the drum is highly likely to absorb water due to heat produced by the processing. Since water can be added while the raw material remains highly likely to absorb water due to heating of the interior of the drum, water absorption in a short time is possible. It is also possible to control the amount of water added so as not to discharge water.

Assume that the parboiled rice manufacturing apparatus according to the present invention is configured to further include air supply means for supplying air into the drum using the water addition means at the time of drying of a raw material by the drying means. In this case, moisture contained in a raw material can be efficiently discharged by the air at the time of drying of the raw material by reducing pressure inside the drum, and a new piece of equipment for supplying the air into the drum need not be provided inside the drum.

Assume that the parboiled rice manufacturing apparatus according to the present invention is configured such that the steam supply means supplies steam into the drum through an opening which is formed in the middle of a first end face of the drum and such that the pressure adjustment means allows the interior of the drum to communicate with outside air through an opening which is formed in the middle of a second end face of the drum. In this case, air inside the drum can be discharged from the end face located on the opposite side from the end face on the steam supply side, and the air inside the drum can be efficiently replaced with steam.

Assume that the parboiled rice manufacturing apparatus according to the present invention is configured such that a screen which uniformly disperses steam supplied from the steam supply means into the drum is disposed on a side closer to the first end face on an inner peripheral surface of the drum. In this case, the steam is uniformly dispersed into the drum through the screen, and steam can be efficiently charged into the drum.

DETAILED DESCRIPTION OF EMBODIMENT

An embodiment of the present invention will be described with reference to the drawings.

Figure 1:
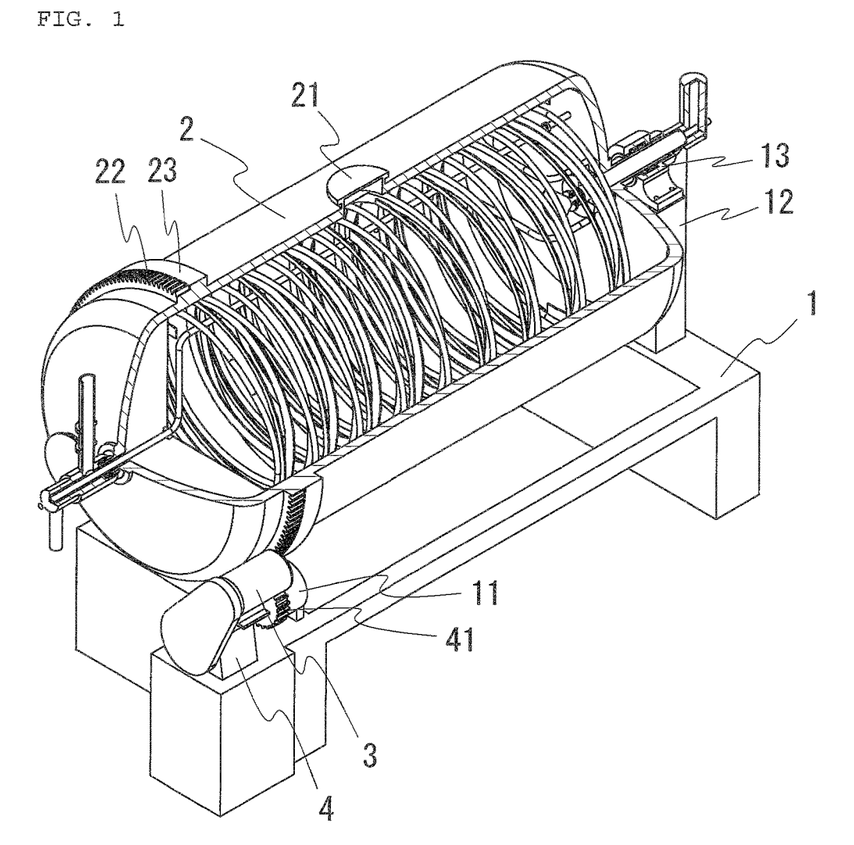
FIG. 1 is a cutaway perspective view of a parboiled rice manufacturing apparatus according to an embodiment of the present invention.
Figure 2:
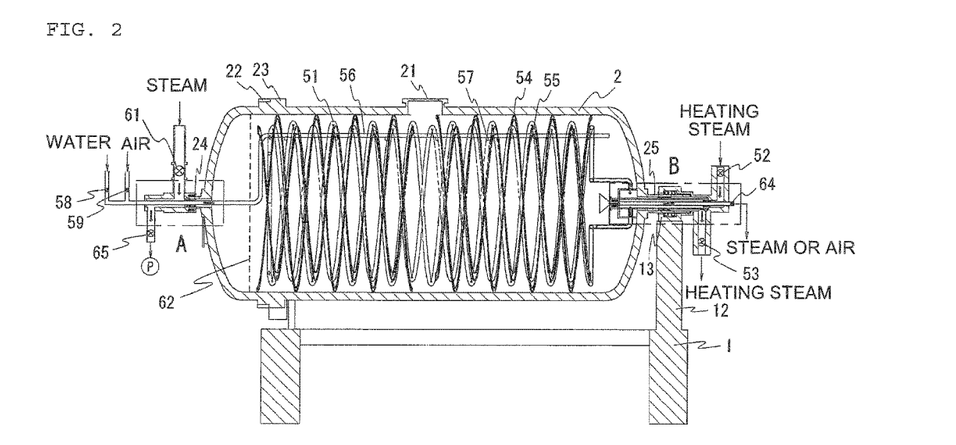
FIG. 2 is a cross-sectional view of the parboiled rice manufacturing apparatus according to the embodiment of the present invention.

FIG. 1 shows a cutaway perspective view of a parboiled rice manufacturing apparatus according to the embodiment of the present invention. FIG. 2 shows a cross-sectional view of the parboiled rice manufacturing apparatus according to the embodiment of the present invention.

The parboiled rice manufacturing apparatus according to the embodiment of the present invention includes a mounting 1, a drum 2 which is laterally provided on the mounting 1 and is supported to be rotatable about a horizontal axis, and a motor 3 which rotationally drives the drum 2.

The motor 3, a reduction gear 4, and one pair of support rollers 11 are provided on one side on an upper surface of the mounting 1 while a support pillar 12 is provided on the other side on the upper surface of the mounting 1. A drive gear 41 is provided on an output shaft of the reduction gear 4, and driving force of the motor 3 is transmitted to the drive gear 41 via the reduction gear 4.

A raw material hatch 21 is provided in the middle in an axial direction on a peripheral surface of the drum 2. A driven gear 22 which engages with the drive gear 41 and a protruding section 23 which is supported by the one pair of support rollers 11 are formed on the side closer to one end face on the peripheral surface of the drum 2 over the entire perimeter.

An opening is formed in the center of each end face of the drum 2, and an interior and an exterior of the drum 2 communicate with each other via respective interiors of a first circular tubular section 24 which extends from the one end face to the outside and a second circular tubular section 25 which extends from the other end face to the outside.

In the drum 2, the protruding section 23 formed on the side closer to the one end face is supported by the one pair of support rollers 11 while the second circular tubular section 25 provided at the other end face is supported by a bearing 13 which is fixed on the support pillar 12. The drum 2 is rotationally driven at a rotation rate of 3 to 7 rpm with the driving force of the motor 3 transmitted from the drive gear 41 to the driven gear 22.

As shown in FIG. 2, a heating pipe 51 which heats the interior of the drum 2, agitator blades 54 and 55 which agitate a raw material charged through the raw material hatch 21 into the drum 2, and a water addition pipe 56 which adds water to the raw material inside the drum 2 are disposed inside the drum 2.

The heating pipe 51 is disposed to extend between the two end faces such that one pipe forms a double helix inside the drum 2. The heating pipe 51 is also disposed so as to rotate integrally with the drum 2.

With opening of a heating steam supply valve 52 and a heating steam discharge valve 53, heating steam is supplied from a heating steam supply source (not shown) outside the drum to the heating pipe 51 via the interior of the second circular tubular section 25. The heating steam flows through the heating pipe 51 inside the drum 2. After heating of the interior of the drum 2, the heating steam is discharged to outside the drum via the interior of the second circular tubular section 25.

In each of the agitator blades 54 and 55, blade members which form forward and reverse helixes, are disposed to face each other across the middle so as to transfer the raw material to the middle in the axial direction inside the drum 2.

The agitator blades 54 and 55 are provided with two types of blade members having different diameters. The first agitator blade 54 is fixed to an inner peripheral surface of the drum 2 while the second agitator blade 55 is fixed to the heating pipe 51. With this configuration, the agitator blades 54 and 55 rotate integrally with the drum 2. The disposition of the two types of blade members as the agitator blades 54 and 55 allows enhancement of force to agitate and force to transfer the raw material.

The water addition pipe 56 is disposed inside the drum 2 such that one straight pipe is located inside the heating pipe 51. The water addition pipe 56 is provided with a plurality of water addition nozzles 57. The water addition pipe 56 is disposed so as not to rotate together with the drum 2.

With opening of a water supply valve 58, water is supplied from a water supply source (not shown) outside the drum to the water addition pipe 56 via the interior of the first circular tubular section 24. The water is added to the raw material through the plurality of water addition nozzles 57 provided at the water addition pipe 56 in the form of a mist or a shower inside the drum 2.

Air can be supplied from an air supply source (not shown) outside the drum to the water addition pipe 56 by opening an air supply valve 59 while the water supply valve 58 is closed.

With opening of a steam supply valve 61, steam is supplied from a steam supply source (not shown) outside the drum into the drum 2 via the interior of the first circular tubular section 24.

A screen 62 can be disposed on the side closer to the one end face on the inner peripheral surface of the drum 2. The screen 62 uniformly disperses steam that is supplied from the steam supply source via the interior of the first circular tubular section 24 into the drum 2. If a screen with meshes finer than the particle diameter of the raw material is disposed as the screen 62, the raw material can be prevented from building up at an end portion on one side of the drum 2.

A safety valve (not shown) is provided at a position closer to the end face than the screen 62 on the side closer to the one end face in the drum 2. The drum 2 can automatically lower the pressure inside the drum 2 to a value not more than a predetermined set value by emitting steam inside the drum 2 through the safety valve, if the pressure inside the drum 2 exceeds a set value determined as abnormal.

The interior of the drum 2 can be made to communicate with outside air via the interior of the second circular tubular section 25 by opening a drum open valve 64 which is provided at an outside air communicating pipe 63 (to be described later).

If the drum open valve 64 is left open when steam is supplied from the steam supply source into the drum 2, air inside the drum 2 can be discharged from the other end face located on the opposite side from the steam supply side. For this reason, air inside the drum 2 can be efficiently replaced with steam.

The interior of the drum 2 can be placed in a pressurized state by closing the drum open valve 64 when steam is supplied into the drum 2.

The interior of the drum 2 can be made to communicate with a vacuum pump outside the drum via the interior of the first circular tubular section 24 by opening a suction valve 65.

The raw material inside the drum 2 can be dried by reducing the pressure inside the drum 2 using the vacuum pump. If air is supplied from the air supply source into the drum 2 using the water addition pipe 56 at the time of the drying, moisture contained in the raw material can be absorbed in the air and be appropriately discharged to outside the drum 2.

Figure 3:
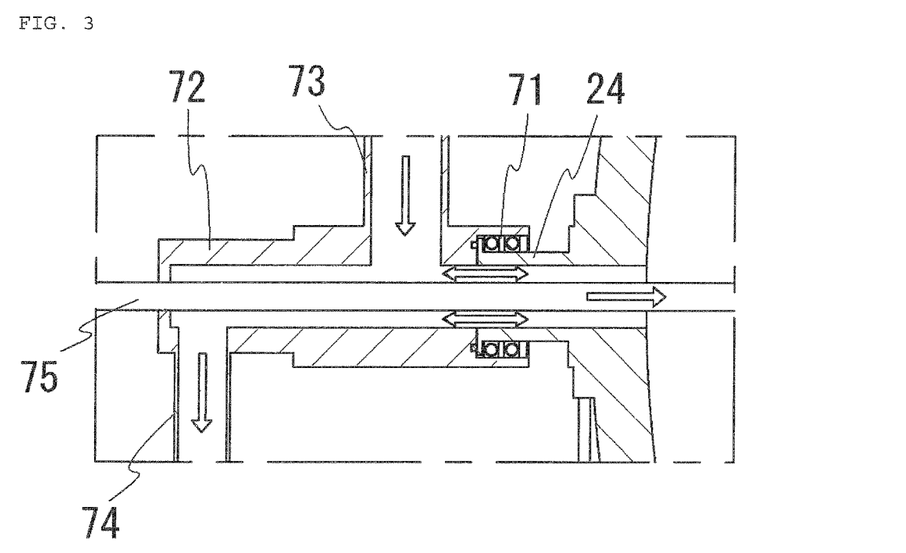
FIG. 3 is an enlarged view of part A in FIG. 2.
Figure 4:
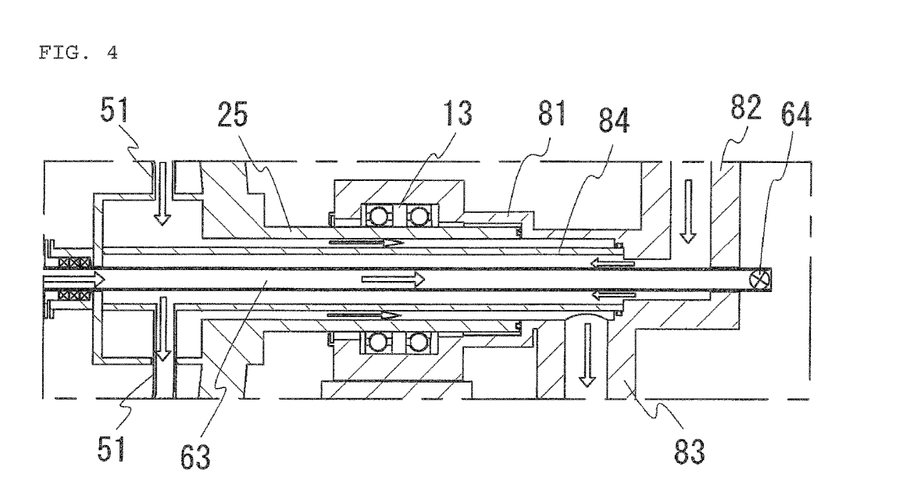
FIG. 4 is an enlarged view of part B in FIG. 2.

FIG. 3 shows an enlarged view of part A in FIG. 2. FIG. 4 shows an enlarged view of part B in FIG. 2.

As shown in FIG. 3, a piece 72 of first piping is connected to the first circular tubular section 24 via a bearing 71 to be relatively rotatable.

A steam supply pipe 73 which communicates with the steam supply source and a suction pipe 74 which communicates with the vacuum pump are connected to the piece 72 of first piping. The piece 72 of first piping, the steam supply pipe 73, and the suction pipe 74 here may be integrally formed or separately formed.

A piece 75 of water addition piping which supplies water or air from the water supply source or the air supply source to the water addition pipe 56 via the interior of the first circular tubular section 24 is disposed in the center of the piece 72 of first piping so as not to rotate together with the drum 2.

A channel which makes the steam supply pipe 73 and the suction pipe 74 and the interior of the drum 2 communicate with one another is formed between respective inner peripheral surfaces of the piece 72 of the first piping and the first circular tubular section 24 and an outer peripheral surface of the piece 75 of water addition piping.

As shown in FIG. 4, a piece 81 of second piping is connected to the second circular tubular section 25 via the bearing 13 to be relatively rotatable.

A heating steam supply pipe 82 which communicates with the heating steam supply source and a heating steam discharge pipe 83 which discharges the above-described heating steam through the heating pipe 51 are connected to the piece 81 of second piping. The piece 81 of second piping, the heating steam supply pipe 82, and the heating steam discharge pipe 83 here may be integrally formed or separately formed.

A circular tubular wall 84 is disposed inside the second circular tubular section 25 so as to rotate integrally with the drum 2.

Additionally, inside the circular tubular wall 84, the outside air communicating pipe 63 that allows the interior of the drum 2 to communicate with outside air by opening the drum open valve 64, as described earlier, is disposed so as not to rotate together with the drum 2.

A channel which makes the heating steam supply pipe 82 and the heating pipe 51 communicate with each other is formed between an inner peripheral surface of the circular tubular wall 84 and an outer peripheral surface of the outside air communicating pipe 63. A channel which makes the heating pipe 51 and the heating steam discharge pipe 83 communicate with each other is also formed between respective inner peripheral surfaces of the second circular tubular section 25 and piece 81 of second piping and an outer peripheral surface of the circular tubular wall 84.

An example of manufacture of parboiled rice using the parboiled rice manufacturing apparatus according to the embodiment of the present invention will be described.

(1) Charge of Raw Material

The heating steam supply valve 52 and the heating steam discharge valve 53 are opened, and heating steam is supplied from the heating steam supply source (not shown) to the heating pipe 51. The heating steam is made to flow through the heating pipe 51 to heat the interior of the drum 2.

Unhulled rice or brown rice as a raw material is charged through the raw material hatch 21 facing upward into the drum 2. The drum 2 is rotated at a rotation rate of 3 to 7 rpm, and the agitator blades 54 and 55 start agitation of the raw material. The moisture content of the unhulled rice or brown rice as the raw material is 8 to 15% here. The heating of the interior of the drum 2 and the agitation of the raw material through the rotation of the drum 2 are continued until manufacture of parboiled rice ends.

(2) Preliminary Pressurized Steam-Boiling Treatment

The steam supply valve 61 is opened, and steam is continuously supplied from the steam supply source into the drum 2 with an internal pressure of 0 to 0.01 MPa (pressure is expressed hereinafter in terms of gauge pressure) for about 60 to 180 seconds. At this time, the suction valve 65 is closed, and the drum open valve 64 located at the end face on the opposite side to the steam supply side is opened. In this state, air inside the drum 2 is discharged through the drum open valve 64 while being pushed by the steam, and the air inside the drum 2 is efficiently replaced with the steam.

After the air inside the drum 2 is replaced with the steam, the drum open valve 64 is closed while the steam supply into the drum 2 is continued. The pressure inside the drum 2 is increased by the steam to a predetermined pressure of 0.1 to 0.4 MPa over about 60 to 180 seconds.

For 2 to 10 minutes from when the predetermined pressure is reached inside the drum 2 to when starch of the raw material is gelatinized only at a surficial portion of each grain, the raw material is subjected to pressurized steam-boiling treatment while the pressure inside the drum 2 is kept constant by controlling the degree of opening of the steam supply valve 61.

At this time, the rotation of the drum 2 is continued, and the raw material is agitated inside the drum 2. Thus, the whole raw material is evenly treated, and a uniform gelatinized layer is formed at the surficial portion of each grain of the raw material.

After a lapse of the predetermined time, the steam supply valve 61 is closed, and the drum open valve 64 is opened. The pressure inside the drum 2 is reduced to 0 MPa, i.e., the atmospheric pressure over about 60 to 180 seconds.

(3) Water Addition Treatment

The drum open valve 64 is closed, and the water supply valve 58 is opened. Water is supplied from the water supply source (not shown) to the water addition pipe 56. The water is added through the plurality of water addition nozzles 57 provided at the water addition pipe 56 in the form of a mist or a shower at a pace which does not produce a surplus of water inside the drum 2 for 60 to 180 seconds such that the raw material has a predetermined moisture content of 20 to 28%, desirably 20 to 25%. The pressure inside the drum 2 is kept at 0 MPa here.

Since the interior of the drum 2 is heated by the heating pipe 51 at this time, water absorption by the raw material ends in a short time. Additionally, since the rotation of the drum 2 is continued, and the raw material is agitated inside the drum 2, the raw material is evenly treated, and each grain of the raw material uniformly absorbs water over the entire surface.

Since the raw material subjected to the preliminary pressurized steam-boiling treatment has a uniform gelatinized layer formed at the surficial portion of each grain, and the surficial portion is tough, even if the amount of water added is increased to accelerate the speed of water absorption of the raw material, a crack does not appear in the surface of each grain of the raw material.

The raw material subjected to the preliminary pressurized steam-boiling treatment is highly likely to absorb water due to heat. Water is added while the raw material remains highly likely to absorb water due to the heating of the interior of the drum 2, which allows water absorption in a shorter time. It is also possible to control the amount of water added so as not to discharge water.

(4) Tempering

The water supply valve 58 is closed, and tempering is performed for 5 to 20 minutes. The pressure inside the drum 2 is kept at 0 MPa here. The moisture content of the raw material is kept at 20 to 28%.

At this time, the rotation of the drum 2 is continued, and the raw material is agitated inside the drum. Thus, unevenness in moisture of each grain of the raw material is eliminated, and grains of the raw material are made uniform in moisture content.

(5) Pressurized Steam-Boiling Treatment

The steam supply valve 61 is opened, and steam is supplied again from the steam supply source into the drum 2 with an internal pressure of 0 to 0.01 MPa for about 60 to 180 seconds. At this time, the suction valve 65 remains closed, and the drum open valve 64 is opened. In this state, air inside the drum 2 is discharged through the drum open valve 64 while being pushed by the steam, and the air inside the drum 2 is efficiently replaced with the steam.

After the air inside the drum 2 is replaced with the steam, the drum open valve 64 is closed while the steam supply into the drum 2 is continued. The pressure inside the drum 2 is increased by the steam to the predetermined pressure of 0.1 to 0.4 MPa over about 60 to 180 seconds.

For 2 to 10 minutes from when the predetermined pressure is reached inside the drum 2 to when the starch of the raw material is gelatinized to the center of each grain, the raw material is processed through pressurized steam-boiling treatment while the pressure inside the drum 2 is kept constant by controlling the degree of opening of the steam supply valve 61.

At this time, the rotation of the drum 2 is continued, and the raw material is agitated inside the drum 2. Thus, the whole of the raw material is evenly treated, and the starch of the raw material is uniformly gelatinized to the center of each grain.

After a lapse of the predetermined time, the steam supply valve 61 is closed, and the drum open valve 64 is opened. The pressure inside the drum 2 is reduced to 0 MPa, i.e., the atmospheric pressure over about 60 to 180 seconds.

(6) Drying Treatment

The drum open valve 64 is closed, and the suction valve 65 is opened. The vacuum pump is actuated to reduce the pressure inside the drum 2. At this time, the air supply valve 59 is opened, and air is supplied from the air supply source (not shown) into the drum 2 using the water addition pipe 56 while the interior of the drum 2 is kept in a state under a negative pressure of 6 to 20% (about 67 to 200 hPa) of the atmospheric pressure for 3 to 6 hours. With this supply, moisture contained in the raw material can be absorbed in the air and be discharged, and the raw material inside the drum 2 can be efficiently dried.

At this time, the rotation of the drum 2 is continued, and the raw material is agitated inside the drum 2. Thus, the raw material is uniformly and evenly dried.

Additionally, since the interior of the drum 2 is heated to 40 to 70° by the heating pipe 51, the drying ends in a short time.

After the drying ends, the rotation of the drum 2 is stopped with the raw material hatch 21 facing downward, and the heating steam supply valve 52 and the heating steam discharge valve 53 are closed to stop the heating steam supply from the heating steam supply source to the heating pipe 51. Additionally, the vacuum pump is de-actuated, and the suction valve 65 and the air supply valve 59 are closed. Moreover, the drum open valve 64 is opened to return the pressure inside the drum 2 to the atmospheric pressure.

(7) Discharge of Raw Material

The downward-facing raw material hatch 21 is opened to discharge the raw material inside the drum 2. The moisture content of the discharged raw material is 9 to 12% due to the drying treatment.

Since the raw material has been moved to the middle due to the action of the agitator blades resulting from the rotation of the drum 2 during the series of treatments, the raw material can be easily discharged to outside the drum 2.

Note that manufacture of parboiled rice using the parboiled rice manufacturing apparatus according to the embodiment of the present invention is not limited to the above-described example. For example, it is also possible to manufacture parboiled rice without the "preliminary pressurized steam-boiling treatment" in (2) described above or to manufacture parboiled rice by any other method.

Although the parboiled rice manufacturing apparatus according to the present embodiment is configured such that the heating pipe 51 is disposed so as to rotate integrally with the drum 2, the heating pipe 51 can also be disposed so as not to rotate together with the drum 2.

Although the parboiled rice manufacturing apparatus according to the present embodiment is configured to heat the interior of the drum 2 by supplying steam to the heating pipe 51, the interior of the drum 2 may be heated by supplying hot water to the heating pipe 51. Alternatively, the interior of the drum may be heated using a heater instead of the heating pipe 51.

Although the parboiled rice manufacturing apparatus according to the present embodiment is configured such that two types of blade members having different diameters are provided as the agitator blades 54 and 55, only one type of blade member may be provided.

The parboiled rice manufacturing apparatus according to the present embodiment can also be used as a cereal processing apparatus which subjects starch containing cereal, such as wheat or soybean, to pressurized steam-boiling.

The present invention is, of course, not limited to the above-described embodiment, and the constitution of the present invention can be appropriately changed without departing from the scope of the invention.

INDUSTRIAL APPLICABILITY

A parboiled rice manufacturing apparatus according to the present invention is capable of efficiently manufacturing good-quality parboiled rice without increase in overall size as in a conventional apparatus and has excellent usability.

REFERENCE SIGNS LIST 1 mounting
2 drum
3 motor
4 reduction gear
11 support roller
12 support pillar
13 bearing
21 raw material hatch
22 driven gear
23 protruding section
24 first tubular section
25 second tubular section
41 drive gear
51 heating pipe
52 heating steam supply valve
53 heating steam discharge valve
54, 55 agitator blade
56 water addition pipe
57 water addition nozzle
58 water supply valve
59 air supply valve
61 steam supply valve
62 screen
63 outside air communicating pipe
64 drum open valve
65 suction valve
71 bearing
72 piece of first piping
73 steam supply pipe
74 suction pipe
75 piece of water addition piping
81 piece of second piping
82 heating steam supply pipe
83 heating steam discharge pipe
84 circular tubular wall

The invention claimed is:

1. A parboiled rice manufacturing apparatus for processing a raw material inside a drum through pressurized steam-boiling treatment and drying the processed raw material inside the drum, comprising:

a drum which has a raw material hatch provided at a peripheral surface and is disposed to be rotatable about a horizontal axis;

means for rotating the drum;

heating means disposed inside the drum for heating an interior of the drum without supplying steam to the raw material inside the drum;

agitation means disposed inside the drum for agitating a raw material charged through the raw material hatch into the drum;

steam supply means for supplying steam into the drum to the raw material inside the drum;

pressure adjustment means having a valve which allows communication of the interior of the drum with outside air for allowing increase of pressure inside the drum with steam supplied from the steam supply means by closing the valve at the time of processing of the raw material through the pressurized steam-boiling treatment;

water addition means disposed inside the drum for adding water to the raw material inside the drum; and drying means for drying the raw material by reducing the pressure inside the drum.

2. The parboiled rice manufacturing apparatus according to claim 1, wherein the water addition means comprises a water addition pipe which is disposed inside the drum, and water is added, using the water addition pipe, to the raw material after preliminary pressurized steam-boiling treatment for forming a gelatinized layer at the surficial portion of each grain of the raw material in the drum.

3. The parboiled rice manufacturing apparatus according to claim 1, wherein the drying means has a vacuum pump which is capable of communicating with the interior of the drum, and tempers the raw material after water addition by the water addition means and then dries the raw material after the pressurized steam-boiling treatment by reducing the pressure inside the drum using the vacuum pump.

4. The parboiled rice manufacturing according to claim 1, further comprising air supply means for supplying air into the drum using the water addition means at the time of drying of the raw material by the drying means.

5. The parboiled rice manufacturing apparatus according to claim 1, wherein the steam supply means supplies steam into the drum through an opening which is formed in the middle of a first end face of the drum, and the pressure adjustment means allows the interior of the drum to communicate with outside air through an opening which is formed in the middle of a second end face of the drum.

6. The parboiled rice manufacturing apparatus according to claim 5, wherein a screen which uniformly disperses steam supplied from the steam supply means into the drum is disposed on a side closer to the first end face on an inner peripheral surface of the drum.

* * * * *